United States Patent
Cantaloube

(10) Patent No.: US 10,991,259 B2
(45) Date of Patent: Apr. 27, 2021

(54) DRONE REMOTE PILOTING ELECTRONIC SYSTEM, ASSOCIATED METHOD AND COMPUTING PROGRAM

(71) Applicant: THALES, Courbevoie (FR)

(72) Inventor: Christian Cantaloube, Merignac (FR)

(73) Assignee: THALES, Courbevoie (FR)

( * ) Notice: Subject to any disclaimer, the term of this patent is extended or adjusted under 35 U.S.C. 154(b) by 202 days.

(21) Appl. No.: 16/198,632

(22) Filed: Nov. 21, 2018

(65) Prior Publication Data
US 2019/0164434 A1    May 30, 2019

(30) Foreign Application Priority Data
Nov. 24, 2017    (FR) ...................................... 1701232

(51) Int. Cl.
| | | |
|---|---|---|
| *G08G 5/00* | (2006.01) | |
| *B64C 39/02* | (2006.01) | |
| *G05D 1/00* | (2006.01) | |
| *H04B 7/185* | (2006.01) | |

(52) U.S. Cl.
CPC ........... *G08G 5/006* (2013.01); *B64C 39/024* (2013.01); *G05D 1/0033* (2013.01); *G08G 5/0013* (2013.01); *G08G 5/0026* (2013.01); *G08G 5/0056* (2013.01); *G08G 5/0069* (2013.01); *H04B 7/18506* (2013.01); *B64C 2201/127* (2013.01); *B64C 2201/146* (2013.01)

(58) Field of Classification Search
CPC .... G08G 5/006; G08G 5/0056; G08G 5/0069; G08G 5/0013; G08G 5/0026; B64C 39/024; B64C 2201/127; B64C 2201/146; G05D 1/0033; G05D 1/0202; G05D 1/101; H04B 7/18506

USPC ............................................................. 701/2
See application file for complete search history.

(56) References Cited

U.S. PATENT DOCUMENTS

| | | | |
|---|---|---|---|
| 9,588,516 B1* | 3/2017 | Gurel | ...................... G06T 5/002 |
| 2004/0249519 A1* | 12/2004 | Frink | ................... G05D 1/0061 |
| | | | 701/3 |

(Continued)

FOREIGN PATENT DOCUMENTS

WO    20160154944 A1    10/2016

OTHER PUBLICATIONS

French Patent Application No. 1701232, INPI Rapport de Recherche Préliminaire, mailed Sep. 14, 2018, 2 pp.

*Primary Examiner* — Jonathan M Dager
*Assistant Examiner* — Jean W Charleston
(74) *Attorney, Agent, or Firm* — Soquel Group LLC

(57) ABSTRACT

Electronic system for the remote control (3) of drones (2), designed to detect a risk of passing authorized flight zone limits as a function of authorized flight zone limit definition data of the authorized flight limit(s) and the geographical location of the drone or a remote control command received and for determining, as a function of the control command and extrapolation over time of control according to this command, a limit-passing status, and triggering an alarm as a function of the determination; or determining another remote control command intended for the drone to prevent the passing of a flight zone limit; or blocking the transmission to the drone of the remote control command received in order to prevent the drone passing the flight zone limit.

10 Claims, 1 Drawing Sheet

(56) References Cited

U.S. PATENT DOCUMENTS

| | | | |
|---|---|---|---|
| 2008/0033604 A1* | 2/2008 | Margolin | G05D 1/0027 |
| | | | 701/2 |
| 2010/0198514 A1* | 8/2010 | Miralles | B64C 39/00 |
| | | | 701/302 |
| 2016/0240087 A1* | 8/2016 | Kube | G05D 1/0022 |
| 2016/0328979 A1* | 11/2016 | Postrel | H04W 4/46 |
| 2017/0154536 A1* | 6/2017 | Kreiner | G06Q 10/00 |
| 2017/0242431 A1* | 8/2017 | Dowlatkhah | G05D 1/104 |
| 2018/0040249 A1* | 2/2018 | Kuhara | G08G 5/0073 |
| 2019/0135435 A1* | 5/2019 | Dubrulle | G05D 1/0022 |

* cited by examiner

DRONE REMOTE PILOTING ELECTRONIC SYSTEM, ASSOCIATED METHOD AND COMPUTING PROGRAM

TECHNICAL FIELD

The present invention related to the field of remotely piloted or controlled aircraft, also known as UAV (Unmanned Aircraft Vehicle) or RPA (Remotely Piloted Aircraft).

Drones may be controlled by direct commands to the motors and control surfaces, or by "vector" type commands (heading or route+altitude or slope), or by a complex trajectory setpoint, typically a trajectory setpoint composed of GPS points connected by straight segments or arcs. Part of the flight may be made out of sight of the pilot, who will follow it via a ground control station comprising an electronic system for remote control of the drone.

The invention relates to such an electronic drone control system, comprising:
- a first telecommunication interface for establishing a telecommunication link with a drone;
- a second interface for receiving commands for remote control of the drone;
- a first database comprising authorized flight zone limit definition data;
- a processing unit designed to transmit to the drone, via the first interface, remote control commands of the drone received via the second interface and designed to receive, via the first interface, current status information of the drone coming from the drone; and indicating at least its geographical position.

BACKGROUND

The flight takes place under the responsibility of the pilot who must ensure compliance with the regulations and the safety of people and property that are overflown.

In particular, the pilot must always respect the authorized flight zones and not enter prohibited areas. The boundaries of the prohibited zones may include height coordinates and/or horizontal coordinates that should not be crossed.

To contribute to the respect of the authorized and forbidden flight zones, it is known to add to the drone an on-board virtual geocaging module or geofencing module that is designed to trigger the fall of the drone in the event that passes beyond authorized limits. This type of independent device is particularly useful for countering defects in the onboard electronics of the navigation system/guidance/flight controls, or even steering locks, defects that make the drone non-steerable and prevent the pilot from correcting a fault even if the fault is detected.

However, even when a drone is equipped with such an additional virtual geocaging module, the detection by the latter of the passing of an authorized limit is damaging because it is accompanied by the triggering of the fall of the drone, and therefore the probable loss of the drone, even in the event that it is a simple error in the control or programming by the pilot, or a slow correction reaction, while the whole system is otherwise working well.

There is thus a need to contribute to a drone respecting the limits of authorized flight zones.

SUMMARY

For this purpose, according to a first aspect, the invention proposes an electronic remote control system for a drone of the aforementioned type, characterized in that the processing unit is designed to detect a risk of passing an authorized flight zone boundary based on the authorized flight zone limit definition data extracted from the first database and at least a first element of the received current status information and a first remote control command received via the second interface and for, following the detection, performing at least a first operation among a set of operations comprising:
- determination, as a function of the first control command and an extrapolation in time of the control according to the first command, of a situation of passing a limit, and the triggering of an alarm according to the determination;
- determining a second remote control command intended for the drone to prevent the passing of the flight zone limit;
- blocking of the transmission to the drone of the first remote control command received via the second interface to prevent the passing of the flight zone limit.

The invention thus makes it possible to automatically secure and correct the flight of a drone relative to the prohibited and/or authorized flight zones. An electronic remote control system of a drone thus makes it possible to implement preventive virtual geofencing, without having to modify the on-board control unit of the drone and compatible with a virtual geofencing device on-board the drone if necessary.

In the embodiments, the electronic remote control system of the drone according to the invention further comprises one or more of the following characteristics:
- the processing unit is designed to automatically transmit the second command to the drone;
- the processing unit is designed to select one of several modes of operation, wherein the determination of the second remote command comprises, according to the selected mode, at least the determination of one of the elements of the set of elements. comprising the geographical coordinates of a future passage point of the drone, a setpoint of operation of motors and/or the control surfaces of the drone, and a couple comprising a first reference of heading or route and a second reference of altitude or slope, wherein the element is selected from the set of elements according to the selected mode;
- the processing unit is designed to extract current status information of the drone coming from the drone, a first geographical location of the drone resulting from a first device for locating the drone, and a second geographical location of the drone resulting from a second device for locating a virtual geofencing tool on-board the drone, for comparing the first and second geographic locations and for detecting a difference greater than a determined threshold between the geographical locations compared;
- the electronic drone control system comprises a second terrain and/or obstacle database, while the processing unit is designed to update an emergency landing location of the drone to be adopted by the drone upon detection of the cut-off of the telecommunication link between the system and the drone based on terrain and/or obstacle data from the second database, authorized flight zone limit definition data from the first database, the geographical location of the drone indicated by current status information and a maximum distance, in time or distance, to reach the emergency landing location, wherein the processing unit is designed to transmit to the drone the updated emergency landing location via the first telecommunication interface.

According to a second aspect, the present invention proposes a method for remote control of drones that is implemented in an electronic drone control system, comprising the following steps:

establishment of a telecommunication link with a drone; reception of drone control commands;

reception, via the telecommunication link, of current status information of the drone coming from the drone indicating at least its geographical location, wherein the method is characterized in that it comprises the steps of:

detecting the risk of passing an authorized flight zone limit based on authorized flight zone limit definition data extracted from a first database comprising limit definition data of an authorized flight zone and at least one first element among current status information received, and a first received remote control command that is intended to be transmitted to the drone by the remote control system; and following the detection, performing at least a first operation among determining, according to the first control command and an extrapolation in time of a control according to the first command, a limit passing situation, and the triggering of an alarm according to this determination;

determining a second remote control command intended for the drone to prevent the passing of the flight zone limit;

blocking of the transmission to the drone of the first remote control command received via the second interface to prevent the passing of the flight zone limit.

According to a third aspect, the present invention provides a computer program comprising software instructions which, when executed by a computer, implement a method of remote control of a drone as defined above.

BRIEF DESCRIPTION OF THE DRAWINGS

These features and advantages of the invention will become apparent upon reading the description which follows, given solely by way of example, and with reference to the appended drawings, wherein.

DETAILED DESCRIPTION

Figure 1:
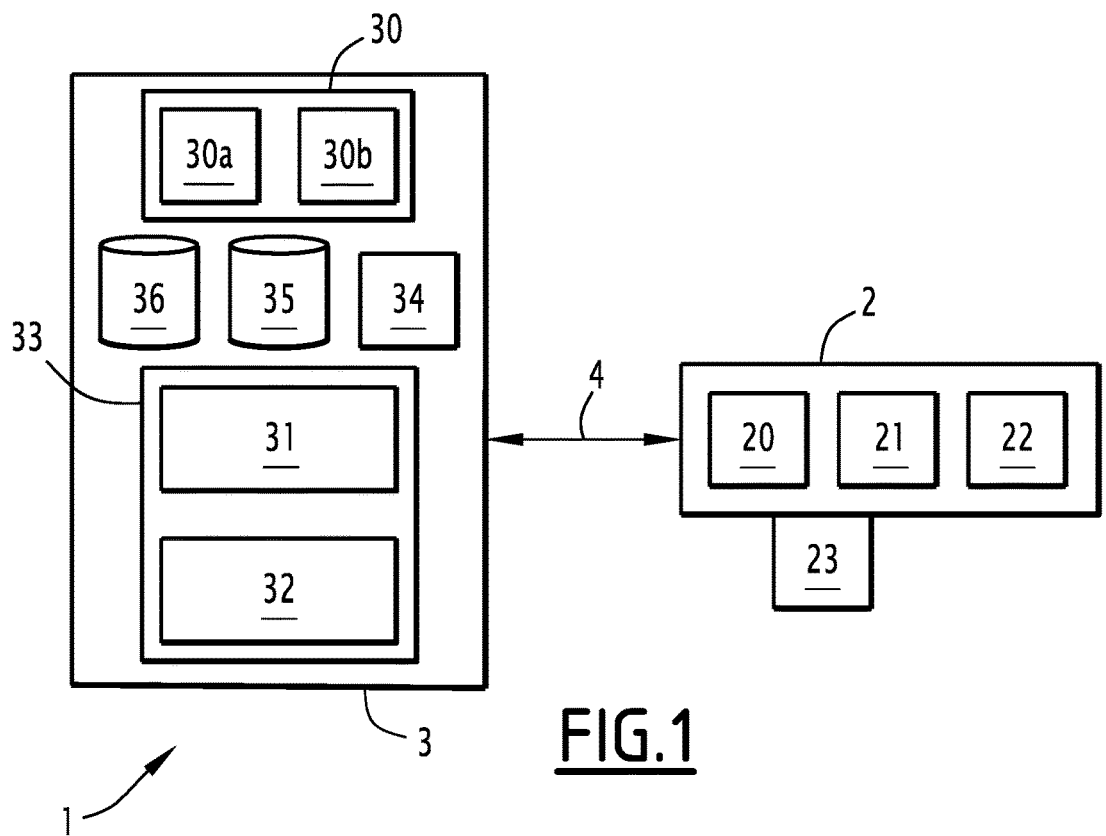
FIG. 1 shows a view of a remote control platform in one embodiment of the invention.

FIG. 1 shows a drone control platform 1 comprising a drone 2 and an electronic remote control system of a drone 3 in one embodiment, which may be found, for example, in an RPS ground station (Remote Pilot Station).

The drone 2 and the electronic remote control system of a drone 3 are able to communicate with each other via a wireless telecommunication link 4, for example in this case, a bidirectional radiofrequency link. A communication protocol for the exchange of control and command information, often called C2 information, for example the open standard MAVLINK is used on this link.

The drone 2 comprises a wireless telecommunication interface 20, a control block 21 and a geolocation block 22. It furthermore comprises, for example, an optional geocaging device 23.

Of course, the drone 2 further comprises the other usual elements of a drone, not shown in FIG. 1: including actuators, control surfaces and motors allowing the drone to move in flight.

The drone 2 may further comprise one or more cameras, etc.

The wireless telecommunication interface 20 is designed to implement the wireless telecommunication link 4 with the system 3 and exchange data with the electronic remote control system 3 on this link 4. It comprises, for example, a transmitter/radio frequency receiver and a radio frequency antenna.

The control block 21 is designed to control the motors and control surfaces by control commands that it provides them based on instructions previously recorded or received by the telecommunication link 4.

The control block 21 controls the motors and control surfaces according to a setpoint mode which is:

a setpoint mode per flight plan (mode 1), based on a list of geographical coordinates (longitude, latitude, altitude) of flight points connected by straight segments or arcs; wherein such a flight plan is typically recorded by the control block 21 prior to the flight of the drone, and is then updated by flight plan modifications transmitted from the electronic remote control system of a drone 3 via the telecommunication link 4;

or a direct setpoint mode (mode 2), based on direct instructions for the motors and control surfaces (e.g. pitch & roll orders) regularly transmitted to the control block 21 from the electronic remote control system of a drone 3 via the telecommunication link 4, wherein the instructions recently received from the system 3 are applied until new instructions are received;

or a mode of control of the "vector" type (mode 3), on the basis of a vector comprising a heading (or a route) to be followed and an altitude (or a slope), transmitted regularly to the control block 21 after updating, from the electronic remote control system of a drone 3 via the telecommunication link 4, so that the heading (or a route) and the altitude (or slope) recently received from the system 3 are followed until a new command vector is received.

In one embodiment, the control block 21 is designed to transmit regularly (for example, several times per second), via the telecommunication interface 20, to the electronic remote control system 3, namely the current status of the drone in terms of position, altitude, attitude, heading, speed, acceleration, state of health.

In the embodiment in question, the geolocation block 22 is designed to determine the geographical position of the drone 2. It comprises a position sensor, for example of the GPS type, and also accelerometer sensors, gyrometers, barometer, magnetometer, wherein they are all designed to determine the geographical coordinates of the drone, for example in the form of latitude, longitude, altitude and other flight parameters such as attitude, heading, speed, acceleration. The geolocation block 22 is designed to transmit regularly this information to the control block 21 (for example, several times per second) which uses them for guidance and control, possibly via the telecommunication interface 20, to the electronic remote control system 3, if this retransmission is not provided by block 21.

The optional geocaging device 23 is also suitable for determining the geographical location of the drone 2, for example independently of the geolocation block 22. It comprises, for example, its own set of sensors: position sensor, for example of the GPS type, and also accelerometer sensors, gyrometers, barometer, magnetometer. It further comprises a memory storing the geographical coordinates of the authorized and/or prohibited flight zones. The optional geocaging device 23 is designed to determine, as a function of the current geographical location that it has determined for the drone from the geographical coordinates of the authorized and/or prohibited flight zones, whether the drone is outside the authorized flight zone or within a prohibited zone, and in such a case, it triggers an emergency procedure to put an end to the infringement, such as cutting off the motor power, blocking the control surfaces and/or triggering the release of a parachute.

In an optional embodiment, the optional geocaging device 23 is also designed, via the telecommunication interface 20, to transmit regularly (for example, several times per minute) to the electronic remote control system 3 the last-determined parameters of the current status of the drone.

The electronic remote control system of a drone 3 comprises a human-machine interface device 30, an electronic processing unit 33, a wireless telecommunications interface 34, a terrain and fixed obstacle database 35 and a database 36 of authorized and/or prohibited zones.

The human-machine interface device 30 is designed to enable interaction with a remote pilot and comprises a viewing interface 30a, tactile or not, and an input interface 30b.

The viewing interface 30a is designed to allow the pilot to display data, in particular images, provided by the processing unit 33 and comprises, for example, a touch screen or not, or a virtual reality helmet (for a field of view increased by 360 degrees according to the pilot's direction of gaze).

The input interface 30b is designed to collect the commands of the pilot (for example, it comprises joysticks, buttons, keyboards, mouse, microphone and a voice recognition tool for selecting fields displayed on the screen 30a . . . ).

The wireless telecommunication interface 34 is designed to implement the wireless telecommunication link 4 with the drone 2 and exchange data with the latter via this link 4. It comprises, for example, a radiofrequency transceiver and a radiofrequency antenna.

The terrain and fixed obstacle database 35 defines a numerical model of 3D elevation of the whole area (relief, obstacles, noteworthy elements: city, river, road, . . . ) that the drone is likely to fly over.

The database 36 of the authorized and/or prohibited zones comprises the geographic coordinates delimiting the authorized and/or prohibited flight zones; wherein the limits may take the form of minimum or maximum heights not to be passed and/or areas defined in terms of longitude and latitude.

In one embodiment, the drone 2 further comprises other sensors, for example air speed, incidence, side-slippage, temperature, while the captured data are also regularly transmitted to the electronic remote control system 3 via the telecommunication interface. 20.

The electronic processing unit 33 comprises in this case a preventive electronic geocaging unit 31 and an electronic ground control and command unit 32.

In the case of FIG. 1, the electronic processing unit 33 comprises, for example, a processor and a memory associated with the processor. The preventive geocaging block 31 and the electronic ground control and command block 32 are, for example, made in the form of respective software programs that may be executed by the processor and stored in the memory in the form of software instructions.

In one variant (not shown), the preventive geocaging block 31 and the electronic ground control and command block 32 are each made in the form of a programmable logic component, such as an FPGA (Field Programmable Gate Array), or in the form of a dedicated integrated circuit, such as an ASIC (Applications Specific Integrated Circuit).

In another variant (not shown), the preventive geocaging block 31 and the electronic ground control and command block 32 are each in the form of software running on different computers, processors and/or screens.

The ground control and command unit 32 comprises, for example, a graphic image generator designed to synthesize one or more navigation images, for example of the horizontal status and of the vertical status, of the current environment of the drone according to the data from the terrain and fixed obstacle database 35, and based at least on data from the drone 2 that are recently received via the wireless telecommunication interface 34 and comprising the current geographical location of the drone 2 determined by the geolocation block 22 and, optionally, the parameters defining the current status of the drone determined by the optional geocaging device 23.

The ground control and command block 32 is designed to provide these navigation images to the human-machine interface device 30 for displaying these images on the display interface 30a.

The preventive geocaging block 31 is designed to receive, via the wireless telecommunication interface 34, the data transmitted by the drone 2 comprising the current geographical location of the drone 2 and other parameters (attitudes, speeds, accelerations, heading, barometric height) determined by the geolocation block 22 and, optionally, the equivalent parameters determined by the optional geocaging device 23. These data are, on the one hand, transmitted to the ground control and command block 32.

On the other hand, the preventive geocaging block 31 is determines whether the drone 2 has passed or is likely to pass an authorized flight zone limit, as a function of the geographical coordinates of the database 36 of the authorized and/or prohibited zones and as a function of:
  at least one control instruction provided by the remote pilot via the human-machine interface device 30,
  and/or the current geographical location of the drone 2 determined by the geolocation block 22,
  and/or parameters defining the current status of the drone determined by the optional geocaging device 23, based on information relating to the wind, to the current status of the motors and the control surfaces, etc.

In one embodiment, if a risk of passing the authorized flight zone limit has been detected, the preventive geocaging block 31 is designed to trigger, via the human-machine interface device 30, a visual and/or audio alert to warn the pilot of the detected problem. It should be noted that this alert may be very anticipated in particular in the case where it takes into account the control instruction provided by the pilot and its projection over time. It will be, for example, gradual depending on the time remaining until the potential passing: wherein there is a warning of a risk if the command was executed without modification until its expiry, then an immediate response is requested when the passing is predictable in a very short time (of the order of a minute or less).

In one embodiment, the preventive geocaging block 31 is designed so that, if a (risk of) passing the authorized flight zone limit has been detected, determining a control correction setpoint of the drone 2 to prevent that the passing of the authorized flight zone limit from taking place (or to return to the authorized flight zone): for example, a turn to the left or right, landing, etc.

The preventive geocaging block 31 is designed to transmit the determined correction setpoint to the drone 2 via the wireless telecommunication interface 34.

In one embodiment, prior to transmitting the correction instruction to the drone 2, the preventive geocaging block 31 is designed to propose the determined correction instruction to the remote pilot, who may validate it or not, via the human-machine interface device 30. In such an embodiment, the preventive geocaging block 31 is designed to transmit the determined correction instruction to the drone 2 only if the latter has been validated by the pilot.

In one embodiment, the preventive geocaging block 31 is designed to compare the geographical location of the drone 2 determined by the geolocation block 22 and, when it is available, the geographical location of the drone 2 determined on the basis of the parameters transmitted by the optional geocaging device 23 by detecting a difference greater than a determined threshold between the compared geographical locations, and triggering an alert warning the remote pilot when such a difference that is greater than a determined threshold has been detected and, optionally, for determining a drone 2 correction instruction that is intended to land the drone at the earliest, as previously transmitted to the drone 2 directly, or after validation by the pilot.

In one embodiment, according to the control mode used by the control block 21 of the drone 2, the preventive geocaging block 31 is designed to selectively:

in the case of a flight plan control mode (mode 1), check that the flight plan is already compatible with the authorized zones before it is recorded in the drone 2, according to the data base of authorized and/or prohibited zone data 36; in the case where the flight plan is not compatible, then the preventive geocaging block 31 is designed to prevent the loading of the flight plan in the drone 2. In one embodiment, the preventive geocaging block 31 is designed to then determine a waiting instruction to replace the flight plan to be loaded (for example, if the flight is in progress, to hover or circle while remaining in the authorized zone) and to transmit it to the drone 2 via the telecommunication interface 34. In one embodiment, the preventive geocaging block 31 is designed to alert the pilot, and, optionally, to determine a modification of the flight plan making it compatible so that the preventive geocaging block 31 will transmit it to the drone 2 as soon as possible after validation by the pilot;

in the case of a direct control mode (mode 2), the preventive geocaging block 31 is designed, as a function of the current position of the drone and the current orders controlling the drone 2, to determine an extrapolation, i.e. to calculate when and where the drone 2 will reach a limit of the authorized flight zone and, as a function of this extrapolation, possibly inform the remote pilot via the human-machine interface 30. When a risk of passing the limits is proven (at about 10 seconds or around ten meters for example), the preventive geocaging block 31 is designed to replace the control commands provided by the pilot via the human-machine interface 30, by more appropriate commands (turning or holding stationary, stacking . . . ) and to transmit it to the drone 2 via the telecommunication interface 34. The triggering instant is calculated by the preventive geocaging block 31 as a function of the possible maneuver and the current conditions of the flight, wind for example, in order to ensure passing the limits does not take place: addition of the best possible corrective trajectory to the instantaneous position, and verification of the limit with respect to this extrapolation.

in the case of a vector control mode (mode 3) and according to the current position of the drone, and the current control vector controlling the drone 2 and/or according to the control vector last transmitted by the pilot via the human-machine interface 30 to be transmitted to the drone 2, the preventive geocaging block 31 is designed, to determine an extrapolation, i.e. to calculate when and where the drone 2 will reach a limit of the authorized flight zone and, as a function of this extrapolation, possibly inform the remote pilot via the human-machine interface 30, and calculate and propose a new, more compatible vector. When the risk of passing the limit is very close, the preventive geocaging block 31 is, for example, designed to transmit to the drone 2 a new vector or an instruction to enter a holding pattern compatible with these limits based on the current position. The triggering instant is calculated by the preventive geocaging block 31 as a function of the possible maneuver and the current conditions of the flight, wind for example, in order to ensure passing the limits does not take place: addition of the best possible corrective trajectory to the instantaneous position, and verification of the limit with respect to this extrapolation.

It should be noted that these provisions also make it possible to prevent initiating a take-off when the zone compatibility conditions are not met: the initial position or non-compatible flight plan, for example.

Civil aviation navigation authorities also generally request that, in the event of a confirmed loss of the telecommunication link, often referred to as a C2 link with the drone, the latter should automatically land as soon as possible at a ground fall-back point in order not to remain in uncontrolled flight.

Figure 2:
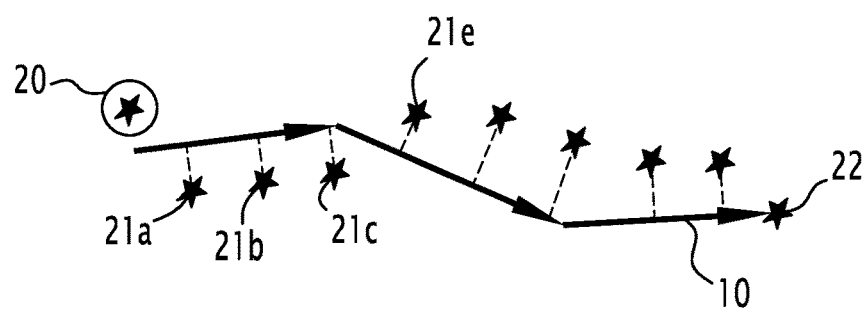
FIG. 2 shows a view of a drone trajectory in one embodiment of the invention.

A virtual geofencing device such as the optional geocaging device 23 may continue to operate even when the control and command telecommunication link 4 is cut off, in order to ensure no passing beyond the authorized flight zone limits; however, most autopilots or flight control systems aboard drones have an automatic facility to return to a specified adjustable "home" point in the event of a link break. For example, with reference to FIG. 2, the "home" point 20 is defined for the trajectory 10 of the drone to the destination 22. However, this point may be incorrectly positioned in an unauthorized zone, or may lead to an attempt to reach it, causing the drone to pass prohibited zone limits, which, in such a case, would result in a fall triggered via the onboard geocaging module 23, if present, and the probable loss of the drone.

Thus, in one embodiment of the invention, the drone 2 is designed to detect a break in the telecommunication link 4 between the system 3 and the drone 2 and in the event of such a detection of such a break, to trigger a procedure for emergency landing at an emergency landing point (optionally in accordance with an emergency landing path) whose coordinates are stored in a so-called emergency landing location of a memory of the control block 21.

In one embodiment of the invention, the preventive geocaging block 31 is designed to automatically update via link 4 an emergency landing location of the drone based on terrain and/or obstacle data from the second database, of authorized and/or forbidden flight zone data, of the geographical location of the drone indicated by current status information and of a maximum distance, in time or distance, for the drone to reach the emergency landing location.

For example, the preventive geocaging block 31 is designed to search for an emergency landing point (and the most appropriate diversion path to reach it) while respecting the authorized and/or prohibited flight zones as defined by the database 36, based on a small section of the nominal path to be flown by the drone 2 according to at least the control instructions transmitted to the drone by the system 3, for example every m minutes or k kilometers of travel, and to transmit to the drone via the telecommunication interface 34, the coordinates of the most suitable emergency landing point based on the current section being flown. Thus, the coordinates of the emergency landing points 21a, 21b, 21c, 21e, . . . are successively defined and transmitted. These points, and, optionally, the associated diversion paths, are determined in one embodiment by also taking into account the nature of the terrain and the obstacles defined by the database 35 and/or the performance of the drone 2 and/or the current position of the drone, in order to reach the best landing point while respecting the authorized zones and flight heights. Thus, the drone 2 will always have, in the event of a link break, a best defined point (and optionally a diversion path) to be applied at the latest in m minutes or k km (for example m=3 and k=3). Upon receipt via the telecommunication interface 20 of the updated coordinates of the emergency landing point and, optionally, the corresponding diversion path, the drone 2 is designed to store these data in the emergency landing location in the memory of the control block 21.

The regular updating of this emergency landing point during the flight makes it possible to secure the drone's journey and to perpetuate its use.

In an optional embodiment, an authentication device, for example in the form of asymmetric keys (PKI), is added on the link 4 to ensure that the drone 2 may not be controlled from a Remote Pilot Station which did not include a preventive geocaging device.

Figure 3:
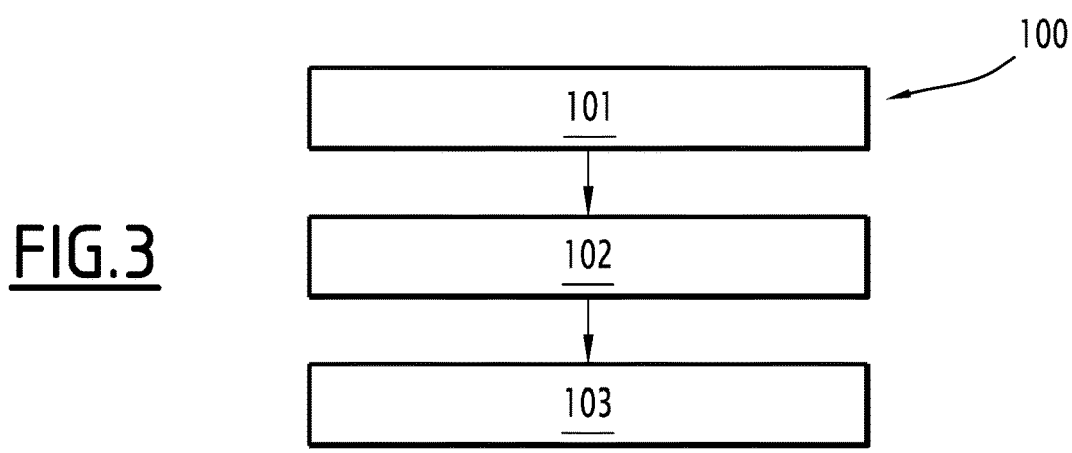
FIG. 3 shows a flowchart of steps implemented in one embodiment of the invention.

With reference to FIG. 3, the steps of a method of remote control of a drone when implemented according to the invention using the electronic remote control system 3, are now described.

In a step 101, the preventive geocaging block 31 receives the data regularly transmitted by the drone 2 and comprising the current geographical location of the drone 2 as determined by the geolocation block 22 and, optionally, the parameters defining the current status of the drone as determined by the optional geocaging device 23, i.e. wind information, etc. The preventive geocaging block 31 also receives, via the human-machine interface 30, control instructions established in accordance with the control mode of the drone 2 (mode 1, 2 or 3) as established by the pilot when the latter wishes to transmit to the drone 2 via the telecommunication interface 34.

The preventive geocaging block 31, in a step 102, determines whether there is a risk of passing (for example, potential passing within 3 min of flight or 3 km distance) authorized flight zone limits as a function of:
 data from the database 36 of authorized and/or prohibited zones and data received from the drone at step 101 and/or remote control instructions received at step 101.

The preventive geocaging block 31 also automatically updates the coordinates of the emergency landing point (and optionally a diversion path for each point) by path segment and transmits them to the drone 2. The drone 2, upon receipt, stores this updated information of the emergency landing point and, optionally, the corresponding diversion path, in the emergency landing memory location of the control block 21. Thus later, upon detection of a break in the link 4, the drone 2 will move towards this best defined point (following the diversion path, if memorized) at most m minutes or km before reaching it.

In a step 103, if it has been determined in step 102 that there is a confirmed risk of passing of the limits by the drone 2, then the preventive geocaging block 31 determines a control instruction for the drone to prevent it passing beyond the flight zone limit, which it then transmits to the drone, possibly after validation by the remote pilot and/or it blocks the transmission to the drone of a received remote control instruction in order to prevent it passing beyond the flight zone limit, which would have led to the implementation by the drone of such a remote control instruction as established in step 102.

The present invention thus makes it possible to secure the path of a drone 2 relative to the prohibited flight zones.

It should be noted that in the example described, the drone 2 is equipped with a geocaging device. However, the invention may be implemented for a drone not equipped with such a device.

In the embodiment described, three different control modes were considered. Of course, a different number of control modes greater than or equal to 1 may be considered.

The invention claimed is:

1. Electronic system for remote piloting control of drones, comprising:
 a first telecommunication interface for establishing a telecommunication link with a drone;
 a second interface for receiving remote control commands for the drone;
 a first database comprising authorized flight zone limit definition data; and
 a processing unit configured (i) to transmit to the drone, via said first telecommunication interface, commands for remote control of the drone received via said second interface, (ii) to receive, via said first telecommunication interface, information on a current status of the drone, coming from the drone and indicating at least its geographical location, and (iii) to detect a risk of passing beyond an authorized flight zone limit according to the authorized flight zone limit definition data as extracted from said first database and based on at least a first remote control command received via said second interface that is intended to be transmitted to the drone by the electronic system and, following this detection, perform at least one operation of a set of operations comprising:
 triggering an alarm following determination of a limit-passing situation, wherein the limit-passing situation is determined as a function of the first remote control command and extrapolation over time of a control in accordance with the first remote control command; and
 blocking transmission to the drone of the first remote control command received via said second interface in order to prevent the drone passing the flight zone limit.

2. Electronic system according to claim 1, wherein said processing unit is further configured, following the detection, (iv) to determine a second remote control command for the drone to prevent passing of the flight zone limit, and (v) to automatically transmit the second command to the drone.

3. Electronic system according to claim 2, wherein said processing unit is designed to further configured to select a mode from among several modes of operation, wherein determination of the second remote control command comprises, according to the mode selected, at least determination of one of the elements comprising geographical coordinates of a future passage point of the drone, an operating instruction for the motors and/or control surfaces of the drone, and a couple comprising a first heading or route term, and a second altitude or slope term, wherein the determined element is selected based on the selected mode.

4. Electronic system according to claim 1, wherein said processing unit is further configured to extract current status information of the drone from the drone, wherein a first geographical location of the drone results from a first device for locating the drone, while a second geographical location of the drone results from a second device for locating a virtual geofencing tool on-board the drone, in order to compare the first and second locations, and to detect a difference greater than a determined threshold between the geographical locations compared.

5. Electronic system according to claim 1, comprising a second database of terrain and/or obstacles, and wherein said processing unit is configured to update an emergency landing location of the drone that is to be adopted by the drone upon detection of a break in the telecommunication link between the electronic system and the drone based on terrain and/or obstacle data from said second database, authorized flight area limit definition data from said first database, the geographical location of the drone indicated by current status information, and a fixed maximum distance deviation, in time or distance, to reaching the emergency landing location, wherein the processing unit is designed to transmit the updated emergency landing location to the drone via said first telecommunication interface.

6. Method for remote piloting control of drones implemented in an electronic drone piloting control system, comprising:
establishing a telecommunication link with a drone;
receiving drone control commands;
further receiving, via the telecommunication link, current status information of the drone coming from the drone and indicating at least its geographical location;
detecting a risk of the drone passing an authorized flight zone limit based on authorized flight zone limit definition data extracted from a first database comprising authorized flight zone limit definition data, and based on at least a first remote control command received that is intended to be transmitted to the drone by the electronic drone piloting control system; and following said detecting, performing at least one operation among an assembly of operations comprising:
triggering an alarm according to determination of a limit-passing status, wherein the limit-passing status is determined as a function of the first control command and extrapolation over time of control according to the first command; and
blocking transmission to the drone of the first remote control command to prevent the passing of the flight zone limit.

7. Method according to claim 6, further comprising:
selecting a mode from among several modes of operation;
determining a second remote control command for the drone to prevent the drone passing beyond the flight zone limit following the detection; and
according to the selected mode, at least determining one of an assembly of elements comprising geographical coordinates of a future passage point of the drone, set point operation of motors and/or control surfaces of the drone, and a couple comprising a first heading or course term, and a second altitude or slope term, wherein the determined element is selected based on the selected mode.

8. Method according to claim 6, further comprising:
extracting current status information of the drone coming from the drone, a first geographical location of the drone coming from a first device for locating the drone, and a second geographical location of the drone coming from a second device for locating a drone through a virtual geofencing tool on board the drone,
comparing the first and second geographic locations, and detection of a difference greater than a determined threshold between the geographical locations compared.

9. Method according to claim 6, further comprising
updating an emergency landing location of the drone to be adopted by the drone upon detection of a break in the telecommunication link between the system and the drone based on terrain and/or obstacle data from a second terrain and/or obstacle database, authorized flight zone limit definition data from the first database, a geographical location of the drone indicated by current status information, and a maximum deviation, in time or distance, from the emergency landing location; and
transmitting the updated emergency landing location to the drone.

10. A non-transitory computer readable medium storing instructions, which, when executed by a processor of an electronic device, cause the processor to implement a method according to claim 6.

* * * * *